United States Patent
Droege et al.

(10) Patent No.: US 11,697,659 B2
(45) Date of Patent: Jul. 11, 2023

(54) PROCESS FOR PREPARING POLYSULFANE SILANES

(71) Applicant: Evonik Operations GmbH, Essen (DE)

(72) Inventors: Helmut Droege, Bornheim (DE); Julia Hermeke, Gerlingen (DE); Kai Dieter Boldt, Hanau (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 17/165,344

(22) Filed: Feb. 2, 2021

(65) Prior Publication Data

US 2021/0246151 A1  Aug. 12, 2021

(30) Foreign Application Priority Data

Feb. 6, 2020 (EP) ..................... 20155849

(51) Int. Cl.
*C07F 7/18* (2006.01)

(52) U.S. Cl.
CPC .................... *C07F 7/1892* (2013.01)

(58) Field of Classification Search
None
See application file for complete search history.

(56) References Cited

U.S. PATENT DOCUMENTS

| | | | | |
|---|---|---|---|---|
| 5,583,245 A | * | 12/1996 | Parker | C07F 7/1892 556/427 |
| 7,501,534 B2 | * | 3/2009 | Korth | C07F 7/1892 556/427 |
| 2019/0161600 A1 | | 5/2019 | Roeben et al. | |

FOREIGN PATENT DOCUMENTS

| | | |
|---|---|---|
| DE | 10 2017 221 234 A1 | 5/2019 |
| EP | 3 489 246 A1 | 5/2019 |

OTHER PUBLICATIONS

European Search Report dated Jul. 9, 2020 in European Application 20155849.1 filed Feb. 6, 2020 (with English Translation of Categories of Cited Documents and Written Opinion), 8 pages

* cited by examiner

*Primary Examiner* — Clinton A Brooks
(74) *Attorney, Agent, or Firm* — Oblon, McClelland, Maier & Neustadt, L.L.P.

(57) ABSTRACT

Process for preparing polysulfane silanes of the formula I $$(R^1O)_{3-m}R^2_mSi-R^3-S_x-R^3-SiR^2_m(OR^1)_{3-m} \qquad I,$$

by reaction of silane of the formula II $$(R^1O)_{3-m}R^2_mSi-R^3\text{-Hal} \qquad II,$$

with one or more metal sulfides of the formula III $$Me(SH)_f \text{ and/or } Me_{3-f}S_{x-y} \qquad III,$$

optionally in the presence of one or more salts of monohydric or polyhydric acids,
with the optional addition of y mol of sulfur in aqueous $R^1$—OH solution, wherein the water content of the aqueous $R^1$—OH solution is 5% to 40% by weight,
wherein
a. the process stream from the reaction of silane of the formula II with one or more metal sulfides of the formula III, optionally in the presence of one or more salts and optionally with the addition of sulfur, in aqueous $R^1$—OH solution, comprising polysulfane silanes of the formula I, silane of the formula II, metal sulfides of the formula III, solvent $R^1$—OH, water and process salts,
is combined with the wash solution from step d, comprising solvent $R^1$—OH, water and polysulfane silanes of the formula I,
b. the solvent $R^1$—OH and water are removed by distillation,
c. the remaining suspension comprising polysulfane silane of the formula I and process salt is subjected to a filtration or a sedimentation and
d. the process salt from step c is washed with solvent $R^1$—OH and then dried, the wash solution comprising solvent $R^1$—OH, water and polysulfane silane of the formula I is recycled to process step a.

9 Claims, No Drawings

PROCESS FOR PREPARING POLYSULFANE SILANES

The invention provides a process for preparing polysulfane silanes.

EP 1130023 discloses the preparation of organosilylalkyl polysulfanes of the formula $(R^1R^2R^3Si-R^4-)_2S_q$ from the organosilylalkyl halide of the formula $R^1R^2R^3Si-R^4-X$. The reaction is carried out by adding a suspension of anhydrous or almost anhydrous ionic sulfide to elemental sulfur and the organosilylalkyl halide in a polar organic solvent. Because of the susceptibility to hydrolysis of the Si-alkoxy bonds of the organosilylalkyl halide, the ionic sulfides must be anhydrous or almost anhydrous.

EP 1700861 discloses the synthesis of sulfur-containing alkoxysilanes using water-containing sulfurization reagents in alcohol. When using different starting materials, large differences in the monomer content of the resulting polysulfidic alkoxysilanes are observed. A reliable, consistent product quality is achieved on an industrial scale only when the average length of the sulfur chain is over 3. Moreover, the use of four solid substances in the disclosed process is disadvantageous on an industrial scale.

WO 2008025580 A1 discloses the preparation of sulfur-containing alkoxysilanes of the formula [R(R)(R'O)Si—R"-]$_2$S$_m$, in which the alkali metal hydroxide content of ail the reactants is <0.44% by weight.

EP 2149579 discloses a process for preparing organosilanes of the general formula I,

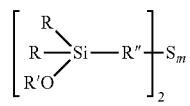

by reaction of (haloorganyl)alkoxysilanes of the formula II,

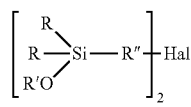

with water-containing alkali metal hydrogen sulfide, sulfur and alkali carbonate in alcohol, wherein the molar ratio (haloorganyl)alkoxysilane of the formula II to alkali metal hydrogen sulfide is between 1:0.4 and 1:0.75 and the molar ratio alkali metal hydrogen sulfide to alkali metal carbonate is between 1:0.5 and 1:1.5.

The disadvantage of the disclosed process is that, when sodium carbonate and/or sodium hydrogen carbonate are used, the suspension obtained after the reaction can be very viscous, with the result that it is not possible to achieve complete removal of solvent and/or filtration using conventional apparatus (stirred-tank reactor).

The invention provides a process for preparing polysulfane silanes of the formula I $$(R^1O)_{3-m}R^2{}_mSi-R^3-S_x-R^3-SiR^2{}_m(OR^1)_{3-m} \quad I,$$

wherein $R^1$ are identical or different and are C1-C10 alkyl groups, preferably $CH_3$ or $C_2H_5$, phenyl groups or alkyl polyether groups $-(R'-O)_r-R''$, where $R'$ are identical or different and are a branched or unbranched, saturated or unsaturated, aliphatic, aromatic or mixed aliphatic/aromatic divalent C1-C30 hydrocarbon group, r is an integer from 1 to 30, and R" are unsubstituted or substituted, branched or unbranched monovalent alkyl, alkenyl, aryl or aralkyl group, $R^2$ are identical or different and are C6-C20 aryl groups, C1-C10 alkyl groups, C2-C20 alkenyl groups, C7-C20 aralkyl groups or halogens, $R^3$ are identical or different and are branched or unbranched, saturated or unsaturated, aliphatic, aromatic or mixed aliphatic/aromatic divalent C1-C30 hydrocarbon groups, and m are identical or different and are 0, 1, 2 or 3, preferably 0, x is 1-10, preferably 2-4, by reaction of silane of the formula II $$(R^1O)_{3-m}R^2{}_mSi-R^3\text{-Hal} \quad II$$

where $R^1$, $R^2$, $R^3$ are as defined above and Hal is a halogen, preferably chlorine or bromine, more preferably chlorine, with one or more metal sulfides of the formula III $$Me(SH)_f \text{ and/or } Me_{3-f}S_{x-y} \quad III$$

where Me is an element of main group 1 or 2, preferably of main group 1, more preferably Na, f=1 for Me of main group 1 and f=2 for Me of main group 2 and y has a value from 0 to x−1, optionally in the presence of one or more salts of monohydric or polyhydric acids, preferably metal carbonates or metal hydrogen carbonates, more preferably sodium carbonate or sodium hydrogen carbonate or corresponding mixtures, with the optional addition of y mol of sulfur, in aqueous $R^1$—OH solvent, wherein $R^1$ is as defined above, the water content of the aqueous $R^1$—OH solution is 5% to 40% by weight, preferably 5% to 15% by weight, which is characterized in that a. the process stream from the reaction of silane of the formula II with one or more metal sulfides of the formula III, optionally in the presence of one or more salts and optionally with the addition of sulfur, in aqueous $R^1$—OH solution, comprising polysulfane silanes of the formula I, solvent $R^1$—OH, water and process salts,
is combined with the wash solution from step d, comprising solvent $R^1$—OH, water and polysulfane silanes of the formula I, b. the solvent $R^1$—OH and water are removed by distillation, c. the remaining suspension comprising polysulfane silane of the formula I and process salt is subjected to a filtration or a sedimentation and d. the process salt from step c is washed with solvent $R^1$—OH and then dried.

the wash solution comprising solvent $R^1$—OH, water and polysulfane silane of the formula I is recycled to process step a.

The process according to the invention may be carried out continuously or batchwise, preferably batchwise.

When carried out as a batchwise process, the wash solution in process step a may originate from step d of a previous batch. When carried out as a batchwise process, the wash solution from process step d may be used in process step a of a subsequent batch.

The solvent $R^1$—OH used in step d may contain from 0% to 20% by weight, preferably from 2% to 10% by weight, of water.

Process steps a and b may be carried out one after the other or in parallel.

The metal sulfides used may be present in anhydrous form or dissolved in water or they may contain water of crystallization.

The sulfur used may be in granular, liquid or powder form.

The alkyl polyether group may be —(R'—O)$_r$—R"
—(CH$_2$—CH$_2$O)$_2$—C$_8$H$_{17}$, —(CH$_2$—CH$_2$O)$_3$—C$_8$H$_{17}$, —(CH$_2$—CH$_2$O)$_4$—C$_8$H$_{17}$, —(CH$_2$—CH$_2$O)$_5$—C$_8$H$_{17}$, —(CH$_2$—CH$_2$O)$_6$—C$_8$H$_{17}$, —(CH$_2$—CH$_2$O)$_7$—C$_8$H$_{17}$, —(CH(CH$_3$)—CH$_2$O)$_2$—C$_8$H$_{17}$, —(CH(CH$_3$)—CH$_2$O)$_3$—C$_8$H$_{17}$, —(CH(CH$_3$)—CH$_2$O)$_4$—C$_8$H$_{17}$, —(CH(CH$_3$)—CH$_2$O)$_5$—C$_8$H$_{17}$, —(CH(CH$_3$)—CH$_2$O)$_6$—C$_8$H$_{17}$, —(CH(CH$_3$)—CH$_2$O)$_7$—C$_8$H$_{17}$,
—(CH$_2$—CH$_2$O)$_2$—C$_9$H$_{19}$, —(CH$_2$—CH$_2$O)$_3$—C$_9$H$_{19}$, —(CH$_2$—CH$_2$O)$_4$—C$_9$H$_{19}$, —(CH$_2$—CH$_2$O)$_5$—C$_9$H$_{19}$, —(CH$_2$—CH$_2$O)$_6$—C$_9$H$_{19}$, —(CH$_2$—CH$_2$O)$_7$—C$_9$H$_{19}$, —(CH(CH$_3$)—CH$_2$O)$_2$—C$_9$H$_{19}$, —(CH(CH$_3$)—CH$_2$O)$_3$—C$_9$H$_{19}$, —(CH(CH$_3$)—CH$_2$O)$_4$—C$_9$H$_{19}$, —(CH(CH$_3$)—CH$_2$O)$_5$—C$_9$H$_{19}$, —(CH(CH$_3$)—CH$_2$O)$_6$—C$_9$H$_{19}$, —(CH(CH$_3$)—CH$_2$O)$_7$—C$_9$H$_{19}$,
—(CH$_2$—CH$_2$O)$_2$—C$_{10}$H$_{21}$, —(CH$_2$—CH$_2$O)$_3$—C$_{10}$H$_{21}$, —(CH$_2$—CH$_2$O)$_4$—C$_{10}$H$_{21}$, —(CH$_2$—CH$_2$O)$_5$—C$_{10}$H$_{21}$, —(CH$_2$—CH$_2$O)$_6$—C$_{10}$H$_{21}$, —(CH$_2$—CH$_2$O)$_7$—C$_{10}$H$_{21}$, —(CH(CH$_3$)—CH$_2$O)$_2$—C$_{10}$H$_{21}$, —(CH(CH$_3$)—CH$_2$O)$_3$—C$_{10}$H$_{21}$, —(CH(CH$_3$)—CH$_2$O)$_4$—C$_{10}$H$_{21}$, —(CH(CH$_3$)—CH$_2$O)$_5$—C$_{10}$H$_{21}$, —(CH(CH$_3$)—CH$_2$O)$_6$—C$_{10}$H$_{21}$, —(CH(CH$_3$)—CH$_2$O)$_7$—C$_{10}$H$_{21}$,
—(CH$_2$—CH$_2$O)$_2$—C$_{11}$H$_{23}$, —(CH$_2$—CH$_2$O)$_3$—C$_{11}$H$_{23}$, —(CH$_2$—CH$_2$O)$_4$—C$_{11}$H$_{23}$, —(CH$_2$—CH$_2$O)$_5$—C$_{11}$H$_{23}$, —(CH$_2$—CH$_2$O$_6$)—C$_{11}$H$_{23}$, —(CH$_2$—CH$_2$O)$_7$)—C$_{11}$H$_{23}$, —(CH(CH$_3$)—CH$_2$O)$_2$—C$_{11}$H$_{23}$, —(CH(CH$_3$)—CH$_2$O)$_3$—C$_{11}$H$_{23}$, —(CH(CH$_3$)—CH$_2$O)$_4$—C$_{11}$H$_{23}$, —(CH(CH$_3$)—CH$_2$O)$_5$—C$_{11}$H$_{23}$, —(CH(CH$_3$)—CH$_2$O)$_6$—C$_{11}$H$_{23}$, —(CH(CH$_3$)—CH$_2$O)$_7$—C$_{11}$H$_{23}$,
—(CH$_2$—CH$_2$O)$_2$—C$_{12}$H$_{25}$, —(CH$_2$—CH$_2$O)$_3$—C$_{12}$H$_{25}$, —(CH$_2$—CH$_2$O)$_4$—C$_{12}$H$_{25}$, —(CH$_2$—CH$_2$O)$_5$—C$_{12}$H$_{25}$, —(CH$_2$—CH$_2$O)$_6$—C$_{12}$H$_{25}$, —(CH$_2$—CH$_2$O)$_7$—C$_{12}$H$_{25}$, —(CH(CH$_3$)—CH$_2$O)$_2$—C$_{12}$H$_{25}$, —(CH(CH$_3$)—CH$_2$O)$_3$—C$_{12}$H$_{25}$, —(CH(CH$_3$)—CH$_2$O)$_4$—C$_{12}$H$_{25}$, —(CH(CH$_3$)—CH$_2$O)$_5$—C$_{12}$H$_{25}$, —(CH(CH$_3$)—CH$_2$O)$_6$—C$_{12}$H$_{25}$, —(CH(CH$_3$)—CH$_2$O)$_7$—C$_{12}$H$_{25}$,
—(CH$_2$—CH$_2$O)$_2$—C$_{13}$H$_{27}$, —(CH$_2$—CH$_2$O)$_3$—C$_{13}$H$_{27}$, —(CH$_2$—CH$_2$O)$_4$—C$_{13}$H$_{27}$, —(CH$_2$—CH$_2$O)$_5$—C$_{13}$H$_{27}$, —(CH$_2$—CH$_2$O)$_6$—C$_{13}$H$_{27}$, —(CH$_2$—CH$_2$O)$_7$—C$_{13}$H$_{27}$, —(CH(CH$_3$)—CH$_2$O)$_2$—C$_{13}$H$_{27}$, —(CH(CH$_3$)—CH$_2$O)$_3$—C$_{13}$H$_{27}$, —(CH(CH$_3$)—CH$_2$O)$_4$—C$_{13}$H$_{27}$, —(CH(CH$_3$)—CH$_2$O)$_5$—C$_{13}$H$_{27}$, —(CH(CH$_3$)—CH$_2$O)$_6$—C$_{13}$H$_{27}$, —(CH(CH$_3$)—CH$_2$O)$_7$—C$_{13}$H$_{27}$,
—(CH$_2$—CH$_2$O)$_2$—C$_{14}$H$_{29}$, —(CH$_2$—CH$_2$O)$_3$—C$_{14}$H$_2$O, —(CH$_2$—CH$_2$O)$_4$—C$_{14}$H$_{29}$, —(CH$_2$—CH$_2$O)$_5$—C$_{14}$H$_{29}$, —(CH$_2$—CH$_2$O)$_6$—C$_{14}$H$_{29}$, —(CH$_2$—CH$_2$O)$_7$—C$_{14}$H$_{29}$, —(CH(CH$_3$)—CH$_2$O)$_2$—C$_{14}$H$_{29}$, —(CH(CH$_3$)—CH$_2$O)$_3$—C$_{14}$H$_{29}$, —(CH(CH$_3$)—CH$_2$O)$_4$—C$_{14}$H$_{29}$, —(CH(CH$_3$)—CH$_2$O)$_5$—C$_{14}$H$_{29}$, —(CH(CH$_3$)—CH$_2$O)$_6$—C$_{14}$H$_{29}$, —(CH(CH$_3$)—CH$_2$O)$_7$—C$_{14}$H$_{29}$,
—(CH$_2$—CH$_2$O)$_2$—C$_{15}$H$_{31}$, —(CH$_2$—CH$_2$O)$_3$—C$_{15}$H$_{31}$, —(CH$_2$—CH$_2$O)$_4$—C$_{15}$H$_{31}$, —(CH$_2$—CH$_2$O)$_5$—C$_{15}$H$_{31}$, —(CH$_2$—CH$_2$O)$_6$—C$_{15}$H$_{31}$, —(CH$_2$—CH$_2$O)$_7$—C$_{15}$H$_{31}$, —(CH(CH$_3$)—CH$_2$O)$_2$—C$_{15}$H$_{31}$, —(CH(CH$_3$)—CH$_2$O)$_3$—C$_{15}$H$_{31}$, —(CH(CH$_3$)—CH$_2$O)$_4$—C$_{15}$H$_{31}$, —(CH(CH$_3$)—CH$_2$O)$_5$—C$_{15}$H$_{31}$, —(CH(CH$_3$)—CH$_2$O)$_6$—C$_{15}$H$_{31}$, —(CH(CH$_3$)—CH$_2$O)$_7$—C$_{15}$H$_{31}$,
—(CH$_2$—CH$_2$O)$_2$—C$_{16}$H$_{33}$, —(CH$_2$—CH$_2$O)$_3$—C$_{16}$H$_{33}$, —(CH$_2$—CH$_2$O)$_4$—C$_1$-8H$_{33}$, —(CH$_2$—CH$_2$O)$_5$—C$_{16}$H$_{33}$, —(CH$_2$—CH$_2$O)$_6$—C$_{16}$H$_{33}$, —(CH$_2$—CH$_2$O)$_7$—C$_{16}$H$_{33}$, —(CH(CH$_3$)—CH$_2$O)$_2$—C$_{16}$H$_{33}$, —(CH(CH$_3$)—CH$_2$O)$_3$—C$_{16}$H$_{33}$, —(CH(CH$_3$)—CH$_2$O)$_4$—C$_{16}$H$_{33}$, —(CH(CH$_3$)—CH$_2$O)$_5$—C$_{16}$H$_{33}$, —(CH(CH$_3$)—CH$_2$O)$_6$—C$_{16}$H$_{33}$ or —(CH(CH$_3$)—CH$_2$O)$_7$—C$_{16}$H$_{33}$.

Polysulfane silanes of the formula I may be:
[(MeO)$_3$Si(CH$_2$)$_3$]$_2$S, [(MeO)$_3$Si(CH$_2$)$_3$]$_2$S$_2$, [(MeO)$_3$Si(CH$_2$)$_3$]$_2$S$_3$, [(MeO)$_3$Si(CH$_2$)$_3$]$_2$S$_4$, [(MeO)$_3$Si(CH$_2$)$_3$]$_2$S$_5$, [(MeO)$_3$Si(CH$_2$)$_3$]$_2$S$_6$, [(MeO)$_3$Si(CH$_2$)$_3$]$_2$S$_7$, [(MeO)$_3$Si(CH$_2$)$_3$]$_2$S$_8$, [(MeO)$_3$Si(CH$_2$)$_3$]$_2$S$_9$, [(MeO)$_3$Si(CH$_2$)$_3$]$_2$S$_{10}$, [(EtO)$_3$Si(CH$_2$)$_3$]$_2$S, [(EtO)$_3$Si(CH$_2$)$_3$]$_2$S$_2$, [(EtO)$_3$Si(CH$_2$)$_3$]$_2$S$_3$, [(EtO)$_3$Si(CH$_2$)$_3$]$_2$S$_4$, [(EtO)$_3$Si(CH$_2$)$_3$]$_2$S$_5$, [(EtO)$_3$Si(CH$_2$)$_3$]$_2$S$_8$, [(EtO)$_3$Si(CH$_2$)$_3$]$_2$S$_7$, [(EtO)$_3$Si(CH$_2$)$_3$]$_2$S$_8$, [(EtO)$_3$Si(CH$_2$)$_3$]$_2$S$_9$, [(EtO)$_3$Si(CH$_2$)$_3$]$_2$S$_{10}$, [(C$_3$H$_7$O)$_3$Si(CH$_2$)$_3$]$_2$S, [(C$_3$H$_7$O)$_3$Si(CH$_2$)$_3$]$_2$S$_2$, [(C$_3$H$_7$O)$_3$Si(CH$_2$)$_3$]$_2$S$_3$, [(C$_3$H$_7$O)$_3$Si(CH$_2$)$_3$]$_2$S$_4$, [(C$_3$H$_7$O)$_3$Si(CH$_2$)$_3$]$_2$S$_5$, [(C$_3$H$_7$O)$_3$Si(CH$_2$)$_3$]$_2$S$_6$, [(C$_3$H$_7$O)$_3$Si(CH$_2$)$_3$]$_2$S$_7$, [(C$_3$H$_7$O)$_3$Si(CH$_2$)$_3$]$_2$S$_8$, [(C$_3$H$_7$O)$_3$Si(CH$_2$)$_3$]$_2$Sg, [(C$_3$H$_7$O)$_3$Si(CH$_2$)$_3$]$_2$S$_{10}$.

Preference may be given to using the following compounds as silanes of the formula II: 3-chlorobutyl(triethoxysilane), 3-chlorobutyl(trimethoxysilane), 3-chlorobutyl(diethoxymethoxysilane), 3-chloropropyl(triethoxysilane), 3-chloropropyl(trimethoxysilane), 3-chloropropyl(diethoxymethoxysilane), 2-chloroethyl(triethoxysilane), 2-chloroethyl(trimethoxysilane), 2-chloroethyl(diethoxymethoxysilane), 1-chloromethyl(triethoxysilane), 1-chloromethyl(trimethoxysilane), 1-chloromethyldiethoxymethoxysilane), 3-chloropropyl(diethoxymethylsilane), 3-chloropropyl(dimethoxymethylsilane), 2-chloroethyl(diethoxymethylsllane), 2-chloroethyl(dimethoxymethylsilane), 1-chloromethyl(diethoxymethylsilane), 1-chloromethyl(dimethoxymethylsilane), 3-chloropropyl(ethoxydimethylsilane), 3-chloropropyl(methoxydimethylsilane), 2-chloroethyl(ethoxydimethylsilane), 2-chloroethyl(methoxydimethylsilane), 1-chloromethyl(ethoxydimethylsilane), 1-chloromethyl(methoxydimethylsilane),
[(C$_9$H$_{19}$O—(CH$_2$—CH$_2$O)$_2$](MeO)$_2$Si(CH$_2$)$_3$Cl,
[(C$_9$H$_{19}$O—(CH$_2$—CH$_2$O)$_3$](MeO)$_2$Si(CH$_2$)$_3$Cl,
[(C$_9$H$_{19}$O—(CH$_2$—CH$_2$O)$_4$](MeO)$_2$Si(CH$_2$)$_3$Cl,
[(C$_9$H$_{19}$O—(CH$_2$—CH$_2$O)$_5$](MeO)$_2$Si(CH$_2$)$_3$Cl,
[(C$_9$H$_{19}$O—(CH$_2$—CH$_2$O)$_6$](MeO)$_2$Si(CH$_2$)$_3$Cl,
[(C$_{12}$H$_{25}$O—(CH$_2$—CH$_2$O)$_2$](MeO)$_2$Si(CH$_2$)$_3$Cl,
[(C$_{12}$H$_{25}$O—(CH$_2$—CH$_2$O)$_3$](MeO)$_2$Si(CH$_2$)$_3$Cl,
[(C$_{12}$H$_{25}$O—(CH$_2$—CH$_2$O)$_4$](MeO)$_2$Si(CH$_2$)$_3$Cl,
[(C$_{12}$H$_{25}$O—(CH$_2$—CH$_2$O)$_5$](MeO)$_2$Si(CH$_2$)$_3$Cl,
[(C$_{12}$H$_{25}$O—(CH$_2$—CH$_2$O)$_6$](MeO)$_2$Si(CH$_2$)$_3$Cl,
[(C$_{13}$H$_{27}$O—(CH$_2$—CH$_2$O)$_2$](MeO)$_2$Si(CH$_2$)$_3$Cl,
[(C$_{13}$H$_{27}$O—(CH$_2$—CH$_2$O)$_3$](MeO)$_2$Si(CH$_2$)$_3$Cl,
[(C$_{13}$H$_{27}$O—(CH$_2$—CH$_2$O)$_4$](MeO)$_2$Si(CH$_2$)$_3$Cl,
[(C$_{13}$H$_{27}$O—(CH$_2$—CH$_2$O)$_5$](MeO)$_2$Si(CH$_2$)$_3$Cl,
[(C$_{13}$H$_{27}$O—(CH$_2$—CH$_2$O)$_6$](MeO)$_2$Si(CH$_2$)$_3$Cl,
[(C$_{14}$H$_{29}$O—(CH$_2$—CH$_2$O)$_2$](MeO)$_2$Si(CH$_2$)$_3$Cl,
[(C$_{14}$H$_{29}$O—(CH$_2$—CH$_2$O)$_3$](MeO)$_2$Si(CH$_2$)$_3$Cl,
[(C$_{14}$H$_{29}$O—(CH$_2$—CH$_2$O)$_4$](MeO)$_2$Si(CH$_2$)$_3$Cl)
[(C$_{14}$H$_{29}$O—(CH$_2$—CH$_2$O)$_5$](MeO)$_2$Si(CH$_2$)$_3$Cl,
[(C$_{14}$H$_{29}$O—(CH$_2$—CH$_2$O)$_8$](MeO)$_2$Si(CH$_2$)$_3$Cl,
[(C$_9$H$_{19}$O—(CH$_2$—CH$_2$O)$_2$]$_2$(MeO)Si(CH$_2$)$_3$Cl,
[(C$_9$H$_{19}$O—(CH$_2$—CH$_2$O)$_3$]$_2$(MeO)Si(CH$_2$)$_3$Cl,
[(C$_9$H$_{19}$O—(CH$_2$—CH$_2$O)$_4$]$_2$(MeO)Si(CH$_2$)$_3$Cl,
[(C$_9$H$_{19}$O—(CH$_2$—CH$_2$O)$_5$]$_2$(MeO)Si(CH$_2$)$_3$Cl,
[(C$_9$H$_{19}$O—(CH$_2$—CH$_2$O)$_6$]$_2$(MeO)Si(CH$_2$)$_3$Cl,
[(C$_{12}$H$_{25}$O—(CH$_2$—CH$_2$O)$_2$]$_2$(MeO)Si(CH$_2$)$_3$Cl,
[(C$_{12}$H$_{25}$O—(CH$_2$—CH$_2$O)$_3$]$_2$(MeO)Si(CH$_2$)$_3$Cl,
[(C$_{12}$H$_{25}$O—(CH$_2$—CH$_2$O)$_4$]$_2$(MeO)Si(CH$_2$)$_3$Cl,
[(C$_{12}$H$_{25}$O—(CH$_2$—CH$_2$O)$_5$]$_2$(MeO)Si(CH$_2$)$_3$Cl,
[(C$_{12}$H$_{25}$O—(CH$_2$—CH$_2$O)$_8$]$_2$(MeO)Si(CH$_2$)$_3$Cl,
[(C$_{13}$H$_{27}$O—(CH$_2$—CH$_2$O)$_2$]$_2$(MeO)Si(CH$_2$)$_3$Cl,
[(C$_{13}$H$_{27}$O—(CH$_2$—CH$_2$O)$_3$]$_2$(MeO)Si(CH$_2$)$_3$Cl,
[(C$_{13}$H$_{27}$O—(CH$_2$—CH$_2$O)$_4$]$_2$(MeO)Si(CH$_2$)$_3$Cl,

[(C$_{13}$H$_{27}$O—(CH$_2$—CH$_2$O)$_5$]$_2$(MeO)Si(CH$_2$)$_3$Cl,
[(C$_{13}$H$_{27}$O—(CH$_2$—CH$_2$O)$_6$]$_2$(MeO)Si(CH$_2$)$_3$Cl,
[(C$_{14}$H$_{29}$O—(CH$_2$—CH$_2$O)$_2$]$_2$(MeO)Si(CH$_2$)$_3$Cl,
[(C$_{14}$H$_{29}$O—(CH$_2$—CH$_2$O)$_3$]$_2$(MeO)Si(CH$_2$)$_3$Cl,
[(C$_{14}$H$_{29}$O—(CH$_2$—CH$_2$O)$_4$]$_2$(MeO)Si(CH$_2$)$_3$Cl,
[(C$_{14}$H$_{29}$O—(CH$_2$—CH$_2$O)$_5$]$_2$(MeO)Si(CH$_2$)$_3$Cl,
[(C$_{14}$H$_{29}$O—(CH$_2$—CH$_2$O)$_6$]$_2$(MeO)Si(CH$_2$)$_3$Cl,
[(C$_9$H$_{19}$O—(CH$_2$—CH$_2$O)$_2$](EtO)$_2$Si(CH$_2$)$_3$Cl,
[(C$_9$H$_{19}$O—(CH$_2$—CH$_2$O)$_3$](EtO)$_2$Si(CH$_2$)$_3$Cl,
[(C$_9$H$_{19}$O—(CH$_2$—CH$_2$O)$_4$]$_3$(EtO)$_2$Si(CH$_2$)$_3$Cl,
[(C$_9$H$_{19}$O—(CH$_2$—CH$_2$O)$_5$](EtO)$_2$Si(CH$_2$)$_3$Cl,
[(C$_9$H$_{19}$O—(CH$_2$—CH$_2$O)$_e$](EtO)$_2$Si(CH$_2$)$_3$Cl,
[(C$_{12}$H$_{25}$O—(CH$_2$—CH$_2$O)$_2$](EtO)$_2$Si(CH$_2$)$_3$Cl,
[(C$_{12}$H$_{25}$O—(CH$_2$—CH$_2$O)$_3$](EtO)$_2$Si(CH$_2$)$_3$Cl,
[(C$_{12}$H$_{25}$O—(CH$_2$—CH$_2$O)$_4$](EtO)$_2$Si(CH$_2$)$_3$Cl,
[(C$_{12}$H$_{25}$O—(CH$_2$—CH$_2$O)$_5$](EtO)$_2$Si(CH$_2$)$_3$Cl,
[(C$_{12}$H$_{25}$O—(CH$_2$—CH$_2$O)$_6$](EtO)$_2$Si(CH$_2$)$_3$Cl,
[(C$_{13}$H$_{27}$O—(CH$_2$—CH$_2$O)$_2$](EtO)$_2$Si(CH$_2$)$_3$Cl,
[(C$_{13}$H$_{27}$O—(CH$_2$—CH$_2$O)$_3$](EtO)$_2$Si(CH$_2$)$_3$Cl,
[(C$_{13}$H$_{27}$O—(CH$_2$—CH$_2$O)$_4$](EtO)$_2$Si(CH$_2$)$_3$Cl,
[(C$_{13}$H$_{27}$O—(CH$_2$—CH$_2$O)$_5$](EtO)$_2$Si(CH$_2$)$_3$Cl,
[(C$_{13}$H$_{27}$O—(CH$_2$—CH$_2$O)$_6$](EtO)$_2$Si(CH$_2$)$_3$Cl,
[(C$_{14}$H$_{29}$O—(CH$_2$—CH$_2$O)$_2$](EtO)$_2$Si(CH$_2$)$_3$Cl,
[(C$_{14}$H$_{29}$O—(CH$_2$—CH$_2$O)$_3$](EtO)$_2$Si(CH$_2$)$_3$Cl,
[(C$_{14}$H$_{29}$O—(CH$_2$—CH$_2$O)$_4$](EtO)$_2$Si(CH$_2$)$_3$Cl,
[(C$_{14}$H$_{29}$O—(CH$_2$—CH$_2$O)$_5$](EtO)$_2$Si(CH$_2$)$_3$Cl,
[(C$_{14}$H$_{29}$O—(CH$_2$—CH$_2$O)$_6$](EtO)$_2$Si(CH$_2$)$_3$Cl,
[(C$_9$H$_{19}$O—(CH$_2$—CH$_2$O)$_2$]$_2$(EtO)Si(CH$_2$)$_3$Cl,
[(C$_9$H$_{19}$O—(CH$_2$—CH$_2$O)$_3$]$_2$(EtO)Si(CH$_2$)$_3$Cl,
[(C$_9$H$_{19}$O—(CH$_2$—CH$_2$O)$_4$]$_2$(EtO)Si(CH$_2$)$_3$Cl,
[(C$_9$H$_{19}$O—(CH$_2$—CH$_2$O)$_5$]$_2$(EtO)Si(CH$_2$)$_3$Cl,
[(C$_9$H$_{19}$O—(CH$_2$—CH$_2$O)$_6$]$_2$(EtO)Si(CH$_2$)$_3$Cl,
[(C$_{12}$H$_{25}$O—(CH$_2$—CH$_2$O)$_2$]$_2$(EtO)Si(CH$_2$)$_3$Cl,
[(C$_{12}$H$_{25}$O—(CH$_2$—CH$_2$O)$_3$]$_2$(EtO)Si(CH$_2$)$_3$Cl,
[(C$_{12}$H$_{25}$O—(CH$_2$—CH$_2$O)$_4$]$_2$(EtO)Si(CH$_2$)$_3$Cl,
[(C$_{12}$H$_{25}$O—(CH$_2$—CH$_2$O)$_5$]$_2$(EtO)Si(CH$_2$)$_3$a,
[(C$_{12}$H$_{25}$O—(CH$_2$—CH$_2$O)$_8$]$_2$(EtO)Si(CH$_2$)$_3$Cl,
[(C$_{13}$H$_{27}$O—(CH$_2$—CH$_2$O)$_2$]$_2$(EtO)Si(CH$_2$)$_3$Cl,
[(C$_{13}$H$_{27}$O—(CH$_2$—CH$_2$O)$_3$]$_2$(EtO)Si(CH$_2$)$_3$Cl,
[(C$_{13}$H$_{27}$O—(CH$_2$—CH$_2$O)$_4$]$_2$(EtO)Si(CH$_2$)$_3$Cl,
[(C$_{13}$H$_{27}$O—(CH$_2$—CH$_2$O)$_5$]$_2$(EtO)Si(CH$_2$)$_3$Cl,
[(C$_{13}$H$_{27}$O—(CH$_2$—CH$_2$O)$_6$]$_2$(EtO)Si(CH$_2$)$_3$Cl,
[(C$_{14}$H$_{29}$O—(CH$_2$—CH$_2$O)$_2$]$_2$(EtO)Si(CH$_2$)$_3$Cl,
[(C$_{14}$H$_{29}$O—(CH$_2$—CH$_2$O)$_3$]$_2$(EtO)Si(CH$_2$)$_3$Cl,
[(C$_{14}$H$_{29}$O—(CH$_2$—CH$_2$O)$_4$]$_2$(EtO)Si(CH$_2$)$_3$Cl,
[(C$_{14}$H$_{29}$O—(CH$_2$—CH$_2$O)$_5$]$_2$(EtO)Si(CH$_2$)$_3$Cl,
[(C$_{14}$H$_{29}$O—(CH$_2$—CH$_2$O)$_6$]$_2$(EtO)Si(CH$_2$)$_3$Cl,
[(C$_9$H$_{19}$O—(CH$_2$—CH$_2$O)$_2$]$_3$Si(CH$_2$)$_3$Cl,
[(C$_9$H$_{19}$O—(CH$_2$—CH$_2$O)$_3$]$_3$Si(CH$_2$)$_3$Cl,
[(C$_9$H$_{19}$O—(CH$_2$—CH$_2$O)$_4$]$_3$Si(CH$_2$)$_3$Cl,
[(C$_9$H$_{19}$O—(CH$_2$—CH$_2$O)$_5$]$_3$Si(CH$_2$)$_3$Cl,
[(C$_9$H$_{19}$O—(CH$_2$—CH$_2$O)$_6$]$_3$Si(CH$_2$)$_3$Cl,
[(C$_{12}$H$_{25}$O—(CH$_2$—CH$_2$O)$_2$]$_3$Si(CH$_2$)$_3$Cl,
[(C$_{12}$H$_{25}$O—(CH$_2$—CH$_2$O)$_3$]$_3$Si(CH$_2$)$_3$Cl,
[(C$_{12}$H$_{25}$O—(CH$_2$—CH$_2$O)$_4$]$_3$Si(CH$_2$)$_3$Cl,
[(C$_{12}$H$_{25}$O—(CH$_2$—CH$_2$O)$_5$]$_3$Si(CH$_2$)$_3$Cl,
[(C$_{12}$H$_{25}$O—(CH$_2$—CH$_2$O)$_6$]$_3$Si(CH$_2$)$_3$Cl,
[(C$_{13}$H$_{27}$O—(CH$_2$—CH$_2$O)$_2$]$_3$Si(CH$_2$)$_3$Cl,
[(C$_{13}$H$_{27}$O—(CH$_2$—CH$_2$O)$_3$]$_3$Si(CH$_2$)$_3$Cl,
[(C$_{13}$H$_{27}$O—(CH$_2$—CH$_2$O)$_4$]$_3$Si(CH$_2$)$_3$Cl,
[(C$_{13}$H$_{27}$O—(CH$_2$—CH$_2$O)$_5$]$_3$Si(CH$_2$)$_3$Cl,
[(C$_{13}$H$_{27}$O—(CH$_2$—CH$_2$O)$_6$]$_3$Si(CH$_2$)$_3$Cl,
[(C$_{14}$H$_{29}$O—(CH$_2$—CH$_2$O)$_2$]$_3$Si(CH$_2$)$_3$Cl,
[(C$_{14}$H$_{29}$O—(CH$_2$—CH$_2$O)$_3$]$_3$Si(CH$_2$)$_3$Cl,
[(C$_{14}$H$_{29}$O—(CH$_2$—CH$_2$O)$_4$]$_3$Si(CH$_2$)$_3$Cl,
[(C$_{14}$H$_{29}$O—(CH$_2$—CH$_2$O)$_5$]$_3$Si(CH$_2$)$_3$Cl or
[(C$_{14}$H$_{29}$O—(CH$_2$—CH$_2$O)$_6$]$_3$Si(CH$_2$)$_3$Cl

The process may be carried out at temperatures from 0° C. to 180° C., preferably at temperatures from 30° C. to 150° C., more preferably at temperatures from 50° C. to 100° C., exceptionally preferably at temperatures from 60° C. to 90° C.

Reaction of Silanes of the Formula II with One or More Metal Sulfides of the Formula III:

The reaction of silane of the formula II with one or more metal sulfides of the formula III may be carried out in any metering sequence; after metering in the other raw materials, it is preferable, for temperature control, to add metal sulfide or metal hydrogen sulfide or silane of the formula II in portions or at a uniform rate over a period of 0.1 to 10 h, preferably 0.5 to 2 h.

The metal sulfide of the formula III, optional sulfur, optional metal carbonate/metal hydrogen carbonate, and solvent may be premixed before the reaction in full or in part.

Haloalkylalkoxysilane of the formula II, optional sulfur, optional metal carbonate/metal hydrogen carbonate, and solvent may be combined or premixed before the reaction in full or in part.

Premixing may take place inside or outside the reaction chamber.

The molar ratio between employed metal sulfides of the formula III and silane of the formula II may be in the range from 0.2 to 2, preferably between 0.4 and 1, more preferably between 0.4 and 0.7.

The molar ratio between employed metal hydrogen sulfides and metal carbonates may be between 0.5 and 2, preferably between 0.8 and 1.2.

The molar ratio between employed solvent R$^1$OH and employed silane of the formula II may be from 0.5 to 100, preferably from 1 to 20, more preferably from 2 to 5.

The solvent R$^1$—OH may contain from 0% by weight to 20% by weight, preferably from 2% by weight to 10% by weight, of water.

The product-wetting parts of the apparatus for carrying out the invention may be made of metals, plastic, ceramic or glass. Preference may be given to using plants made of corrosion-resistant materials, for example enameled or plastic-coated steel or alloyed steel. Particular preference may be given to using plants made of enameled steel, stainless steel, duplex steel, tantalum or Hastelloy.

The reaction may be carried out in a reaction tube or reaction tank, preferably in a reaction tank. The process according to the invention may be carried out in an open or closed vessel. Preference may be given to carrying out the reaction in a closed vessel.

The mixing of the reactor contents may be effected by internal or external circulation. The reaction apparatus may be heated and/or cooled. The heat of reaction may be conducted away by direct or indirect cooling. The heat of reaction may be conducted away by evaporative cooling. Evaporative cooling may be effected using the solvent present in the process. The reaction preferably takes place in a stirred-tank reactor heated and cooled via half-pipe coils or a jacket. The reaction may take place in a closed system. Before addition of individual raw materials, the reactor may be evacuated. Particularly advantageous is evacuation before the metered addition of silane of formula II and metal sulfides or metal hydrogen sulfides. Exceptionally preferably, the reaction vessel may be evacuated before addition of metal sulfides or metal hydrogen sulfides. The process according to the invention may be carried out in such a way that a gas evolved is unable to escape from the reaction chamber. The closed container may preferably be a reaction vessel known from the prior art that permits operation at pressures of 10 Pa to 2 MPa and temperatures of 0° C. to 200° C. The closed container may particularly preferably be a reaction vessel known from the prior art that permits operation at pressures of 10 Pa to 1.2 MPa and temperatures of 0° C. to 150° C.

Process Step a:

The combining in process step a of the process stream from the reaction of silane of the formula II with one or more metal sulfides of the formula III and the wash solution from process step d may be carried out after or before completion of the reaction of silane of the formula II with one or more metal sulfides of the formula III. The combining may take place inside or outside the container used for the reaction. The combining may take place inside the container used for the distillation. The combining may be carried out before or during the distillation process (process step b).

Process Step b:

The removal of solvent by distillation in process step b may take place in a stirred-tank reactor. The stirred-tank reactor may also be the reaction apparatus. The removal of solvent by distillation may take place in a temperature range from 0° C. to 150° C. at a pressure from 0.5 kPa absolute to 150 kPa absolute, preferably in a range from 40° C. to 120° C. at a pressure from 0.5 kPa absolute to 30 kPa absolute. In the course of the removal of solvent by distillation, the pressure in the distillation apparatus may be reduced in a stepwise manner or continuously. The evaporated solvent may be purified or concentrated immediately after its evaporation or subsequently. During evaporation, the contents of the distillation apparatus may be mixed. This mixing may take place by appropriate means either internally or externally. Examples of suitable means of mixing are stirrer units, circulating pumps or by blowing gases or evaporated liquids, in particular steam, through the mixture.

Process Step c:

The removal of solids in process step c may be carried out in various filtration and sedimentation machines. The removal of solids may take place continuously or batchwise. Filtration machines that may be used are filtration centrifuges, filter presses or filter dryers. The sedimentation machine that may be used is a solid-bowl decanter centrifuge. During the filtration process it may be helpful to compensate for a contraction in volume of the filter cake by smoothing or compressing the filter cake. Suitable for this purpose is inter alia the plough unit of a filter dryer.

Process Step d:

The washing of the solid in process step d may be carried out inside or outside the plant component used in the preceding process step. Washing may be carried out continuously or batchwise. During washing, the solid to be washed may be mixed with the solvent $R^1$—OH in a suitable manner. The separation between the wash solution and the washed solid may be executed by sedimentation or by filtration. The washed solid may be separated from the wash solution using solid-bowl decanter centrifuges, filter dryers, filter presses and filter centrifuges. The washing of the resulting filter cake takes place preferably in a filter dryer.

The drying of the solid in process step d may be carried out inside or outside the assembly used for washing the solid. Drying may be carried out batchwise or continuously. Drying may be carried out at temperatures from 0° C. to 150° C., preferably from 40° C. to 100° C. The pressure during drying may be from 0.1 kPa absolute to 150 kPa absolute, preferably from 1 kPa absolute to 102 kPa absolute. In the course of the drying process, the pressure may be lowered and/or the temperature raised. Gases may be used for drying. Nitrogen or air are particularly suitable. The drying of the solid may preferably be carried out in a filter dryer.

Process steps c and d may be carried out in the same apparatus.

A wetting agent may be added before or during the process steps.

An advantage of the process according to the invention is the complete removal of solvent from the suspension, which is made possible by the provision of an adequate amount of liquid to keep the mixture stirrable and mobile during the distillation process. A further advantage is the better handling of the suspension after the end of the distillation. Also advantageous is the increase in yield and increase in the monomer content resulting from the process according to the invention.

EXAMPLES

The average sulfur chain length was determined by means of an analysis described in ASTM D 6844.

For the determination of the monomer content, the peak areas of the sample constituents S2 to S10 were multiplied by the response factors listed in ASTM D 6844 and the sum thereof related to that of peak areas S2 to S10 of the corrected response factors of a standard of known monomer content according to the following formula:

$$Mon_{(sample)} = \frac{Mon_{(std)} \cdot \left( \sum_{n=2}^{10} (area_{(n)} \cdot \text{response } factor_{(n)}) \right)_{sample}}{\sum_{n=2}^{10} (area_{(n)} \cdot \text{response } factor_{(n)})_{(std)}} [\%]$$

Example 1 (Comparative Example)

Into a pressure reactor having a capacity of 2000 ml was weighed 477 g of ethanol, 53 g of water, 137.2 g of sodium carbonate, 38.6 g of sulfur, and 109.2 g of sodium hydrogen sulfide having a water content of 29%. The reactor was closed and evacuated to 10 kPa absolute. The reactor contents were then heated to 70° C., with stirring, and 554.5 g of chloropropyltriethoxysilane was added over a period of 45 minutes at a temperature of 70° C. to 73° C. The reactor contents were then heated to 78° C. and held at this temperature for a further 145 min.

After cooling the reactor contents to 45° C., the removal under reduced pressure of ethanol-water mixture from the suspension remaining in the reactor was commenced. On reaching a temperature of 120° C., the suspension present in the reactor was cooled to 30° C. The reactor was opened and the pasty contents thereof transferred to a porcelain suction filter. After filtration for one hour under vacuum, 323.9 g of bis(triethoxysilylpropyl) polysulfane product having an average sulfur chain length of 2.16 and a monomer content of 80.3% was obtained.

The filter cake from example 1 remaining in the porcelain suction filter was then washed with a mixture of 477 g of ethanol and 53 g of water, with application of vacuum. After 60 minutes, 542 g of wash solution was obtained.

Example 2

Into a pressure reactor having a capacity of 2000 ml was weighed 477 g of ethanol, 53 g of water, 137.2 g of sodium carbonate, 38.6 g of sulfur, and 109.2 g of sodium hydrogen sulfide having a water content of 29%. The reactor was closed and evacuated to 10 kPa absolute. The reactor contents were then heated to 70° C., with stirring, and 554.5 g of chloropropyltriethoxysilane was added over a period of 45 minutes at a temperature of 70° C. to 73° C. The reactor contents were then heated to 78° C. and held at this temperature for a further 145 min.

After cooling the reactor contents to 45° C., the removal under reduced pressure of ethanol-water mixture from the suspension remaining in the reactor was commenced. Once 250 g of distillate had been collected, the wash solution previously obtained from washing the filter cake resulting from example 1 was added and distillation was continued. On reaching a temperature of 120° C., the suspension present in the reactor was cooled to 30° C. The viscosity of the reactor contents was sufficiently low for it to be possible to transfer the suspension to a porcelain suction filter via the bottom outlet of the reactor.

After filtration for one hour under vacuum, 525.7 g of bis(triethoxysilylpropyl) polysulfane product having an average sulfur chain length of 2.14 and a monomer content of 86.0% was obtained.

The invention claimed is:

1. A process for preparing polysulfane silanes of the formula I

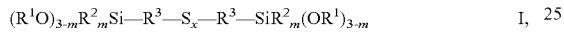     I, wherein $R^1$ are identical or different and are C1-C10 alkyl groups, phenyl groups or alkyl polyether groups —(R'—O)$_r$—R", where R' are identical or different and are a branched or unbranched, saturated or unsaturated, aliphatic, aromatic or mixed aliphatic/aromatic divalent C1-C30 hydrocarbon group, r is an integer from 1 to 30, and R" are unsubstituted or substituted, branched or unbranched monovalent alkyl, alkenyl, aryl or aralkyl group, $R^2$ are identical or different and are C6-C20 aryl groups, C1-C10 alkyl groups, C2-C20 alkenyl groups, C7-C20 aralkyl groups or halogens, $R^3$ are identical or different and are branched or unbranched, saturated or unsaturated, aliphatic, aromatic or mixed aliphatic/aromatic divalent C1-C30 hydrocarbon groups, and m are identical or different and are 0, 1, 2 or 3, x is 1-10, by reaction of silane of the formula II

     II where $R^1$, $R^2$, $R^3$ and m are as defined above and Hal is a halogen, with one or more metal sulfides of the formula III

     III where M is an element of main group 1 or 2, f=1 for M of main group 1 and f=2 for M of main group 2 and y has a value from 0 to x−1, optionally in the presence of one or more salts of monohydric or polyhydric acids, with the optional addition of y mol of sulfur, in aqueous $R^1$—OH solvent, wherein $R^1$ is as defined above, the water content of the aqueous $R^1$—OH solution is 5% to 40% by weight, characterized in that a. the process stream from the reaction of silane of the formula II with one or more metal sulfides of the formula III, optionally in the presence of one or more salts and optionally with the addition of sulfur, in aqueous $R^1$—OH solution, comprising polysulfane silanes of the formula I, solvent $R^1$—OH, water and process salts, is combined with a wash solution from step d, comprising solvent $R^1$—OH, water and polysulfane silanes of the formula I, b. the solvent $R^1$—OH and water are removed by distillation, c. a remaining suspension comprising polysulfane silane of the formula I and process salt is subjected to a filtration or a sedimentation, d. the process salt from step c is washed with solvent $R^1$—OH and then dried, and the wash solution comprising solvent $R^1$—OH, water and polysulfane silane of the formula I is recycled to process step a.

2. The process of claim 1, characterized in that the process is carried out at temperatures from 0° C. to 180° C.

3. The process of claim 1, characterized in that the polysulfane silanes of the formula I are [(EtO)$_3$Si(CH$_2$)$_3$]$_2$S, [(EtO)$_3$Si(CH$_2$)$_3$]$_2$S$_2$, [(EtO)$_3$Si(CH$_2$)$_3$]$_2$S$_3$, [(EtO)$_3$Si(CH$_2$)$_3$]$_2$S$_4$, [(EtO)$_3$Si(CH$_2$)$_3$]$_2$S$_5$, [(EtO)$_3$Si(CH$_2$)$_3$]$_2$S$_6$, [(EtO)$_3$Si(CH$_2$)$_3$]$_2$S$_7$, [(EtO)$_3$Si(CH$_2$)$_3$]$_2$S$_8$, [(EtO)$_3$Si(CH$_2$)$_3$]$_2$S$_9$, or [(EtO)$_3$Si(CH$_2$)$_3$]$_2$S$_{10}$.

4. The process of claim 1, characterized in that the process steps a and b are carried out in parallel.

5. The process of claim 1, characterized in that the process is carried out continuously or batchwise.

6. The process of claim 1, characterized in that, if carried out in a batchwise operation, the wash solution in process step a originates from step d of a previous batch.

7. The process of claim 1, characterized in that, in process step d, the washed solid may be separated from the wash solution using solid-bowl decanter centrifuges, filter dryers, filter presses or filter centrifuges.

8. The process of claim 1, characterized in that a wetting agent is added before or during the process steps.

9. The process of claim 1, characterized in that the removal of solvent by distillation in process step b takes place in a temperature range from 0° C. to 150° C. at a pressure from 0.5 kPa absolute to 150 kPa absolute.

* * * * *